July 3, 1962     G. A. MARSH ET AL     3,042,863
APPARATUS FOR MEASURING CREVICE CORROSION
Filed Nov. 25, 1959
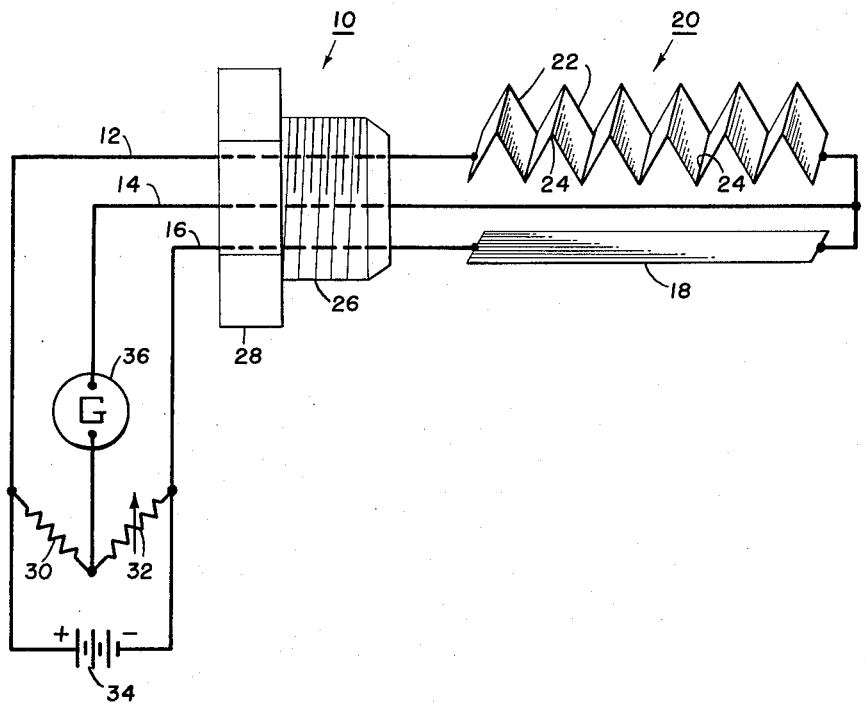
INVENTORS
GLENN A. MARSH
EDWARD SCHASCHL
BY
*Edward H Long*
ATTORNEY United States Patent Office 3,042,863
Patented July 3, 1962

3,042,863
APPARATUS FOR MEASURING CREVICE CORROSION
Glenn A. Marsh and Edward Schaschl, Crystal Lake, Ill., assignors to The Pure Oil Company, Chicago, Ill., a corporation of Ohio
Filed Nov. 25, 1959, Ser. No. 855,384
6 Claims. (Cl. 324—71)

This invention is directed to an apparatus and method for measuring crevice-type corrosion. More particularly, this invention is directed to a resistance-change-type corrosion-measuring device which is peculiarly adapted to measure crevice corrosion.

In studying the corrosivity of various environments toward materials of construction, it is frequently desirable to determine the tendency toward corrosion in crevices and cracks, as compared with the more normal surface corrosion. In general, such corrosion may be called crevice corrosion. In many cases, relatively rapid corrosion of the metal surface may be tolerable, but the extremely high rates of crevice-type corrosion encountered under certain circumstances may cause failure of the corrodible structure in a very short time. Crevice corrosion is especially serious in aerated, aqueous solutions and in liquids which contain suspended solids.

Various corrosion-test probes, test coupons, and other devices have been used in the past for determining surface corrosion rates. Corrosion-test probes and measurement devices of the resistance-change type, as described in Patents Nos. 2,834,558 and 2,851,570 to Edward Schaschl, and 2,824,283 to Lynn Ellison, have been found especially useful in measuring surface corrosion rates, but have been found unsatisfactory for determining crevice corrosion rates. In accordance with this invention, a corrosion probe having a novel corrodible element has been devised by means of which crevice corrosion rates can be very readily determined.

It is an object of this invention to provide a method for measuring crevice-corrosion rates of electrically conductive, corrodible metals.

Yet another object of this invention is to provide a method and apparatus for measuring the tendency of corrosive environments to produce crevice-type corrosion.

It is another object of this invention to provide an apparatus for measuring rates of cervice corrosion in comparison with surface corrosion rates in the same environment.

Briefly, the corrosion probe of this invention consists of two corrodible, electrically conductive, ribbon-like test specimens, the first of which is a bare strip of the metal under test, and the second of which is a similar strip which is rebent to form a series of accordian-like pleats. The two specimens are connected to a common conductor at one terminal end of each specimen, and the other terminal ends of the specimens are connected to separate conductors. The conductors are connected to form an electrical bridge circuit of the Wheatstone-bridge type with the two specimens connected in separate but adjacent branches of the bridge. The specimen consisting of the unbent strip of metal serves as a reference specimen. Thus, the test probe of this invention is similar to the probes described in the aforenamed patents, with the difference that the reference specimen need not be coated and the test specimen is rebent to form a plurality of accordian-like pleats.

When the probe is placed in an environment which causes surface corrosion but not crevice corrosion, the electrical resistance of the two specimens change at approximately the same rate as metal is corroded from their surfaces. Temperature compensation is provided similar to other resistance-change-type corrosion probes known to the prior art. If the test environment causes crevice corrosion, the resistance of the pleated specimen changes more rapidly than the resistance of the reference specimen, due to the accelerated corrosion rates at the crevices produced by the bends in the specimen. The rate at which the ratio of the resistances of the specimens changes is proportional to the rate at which crevice corrosion occurs. Alternately, the compensating or unbent specimen may be coated with a corrosion-resistant material, in which case the change in the ratio of the resistances of the specimens is proportional to the total corrosion, surface corrosion plus crevice corrosion, occurring at the uncoated specimen.

The invention is best described with reference to the drawing, which depicts a test probe constructed in accordance with this invention. Base member 10 is made to accommodate lead wires 12, 14, and 16, which pass through base 10 in electrically-insulated relationship therewith. Reference specimen 18 is a bare, ribbon-like, uncoated strip of metal, preferably about 0.001 to 0.01 inch thick, 0.1 to 0.2 inch wide, and 2 to 5 inches long, but other dimensions may be used. Pleated specimen 20 is fabricated of the same metal as is reference specimen 18, but preferably is 2 to 5 times wider and 2 to 5 times longer than is compensating specimen 18. Specimen 20 is rebent sharply into a series of accordian pleats 22 to form crevices at points 24. The angles between the adjacent rebent portions of the specimen are preferably made as small as possible without causing appreciable contact between the adjacent rebent surfaces. Angles ranging between 2° and 10° have been found satisfactory. The number of pleats is not critical, but it is preferred to use at least about 10 pleats to attain a reasonable degree of sensitivity and to decrease the length of time required to complete a test. The pleats need not be of uniform length. All soldered joints and lead wires are preferably coated with an electrically insulating material.

A Wheatstone-bridge measuring circuit is shown connected to the conductors 12, 14, and 16. Elements 30 and 32, which are connected in the remaining two arms of the bridge, are resistances, at least one of which, 32, is variable. Thus the bridge circuit is composed of four arms, represented by the resistances 30 and 32, and the specimens 18 and 20. These four arms are serially connected to produce four points of juncture. A potential source, such as battery 34, is connected across two opposite points of juncture, and galvanometer 36 is connected across the remaining two points of juncture. If the bridge is initially balanced, and this balance is disturbed by changing the ratio of the resistances of specimens 18 and 20, the galvanometer will deflect in proportion to this change in ratio.

The lead wires 12, 14, and 16 may be made with sufficient rigidity to provide mechanical support for the two specimens, 18 and 20. Alternatively, the specimens may be supported by other structure, which is in turn supported by base 10. Various specimen-support means are described in the aforenamed patents to Edward Schaschl. Base 10 is preferably provided with threads 26 for inserting the probe into a threaded opening in a process vessel. The base is provided with an octagon head 28 to accommodate a wrench which may be used to tighten the probe in place. In the event that it is desired to measure total corrosion at specimen 20, rather than crevice corrosion alone, specimen 18 may be coated with a corrosion-preventing material, as described in the aforenamed patents. In this case, it is not necessary that the two specimens be fabricated of the same metal. It is sufficient if the two specimens are fabricated from metals having very similar temperature-resistance characteristics, so that adequate temperature compensation will be provided.

The embodiments of the invention in which an exclusive property or privilege is claimed are defined as follows:

1. An apparatus for measuring crevice corrosion comprising a first ribbon-like specimen of corrodible, electrically-conductive metal, a second ribbon-like specimen of a corrodible metal having temperature-resistance charteristics similar to that of the first specimen, said second specimen being transversely rebent to form a plurality of accordian-like pleats, means for supporting said first and second specimens for exposure to a corrosive environment, and electrical means electrically connected to the terminal ends of said specimens for measuring the ratio of the resistances of said specimens.

2. An apparatus according to claim 1 in which the angle included between adjacent, rebent portions of said second specimen is about 2° to 10°.

3. A corrosion probe for measuring crevice corrosion in a corrosion environment comprising a base, two corrodible, ribbon-like test specimens fabricated of the same metal and supported by said base for exposure to a corrosive environment, one of said specimens being transversely rebent to form a plurality of accordian-like pleats, and three electrical conductors extending through said base in electrically-insulated relationship, the first electrical conductor being connected to one terminal end of each of said specimens, and the second and third electrical connectors being connected respectively to the other terminal ends of the pleated specimen and of the other specimen.

4. An apparatus according to claim 3 in which the angle included between adjacent rebent portions of said pleated specimen is about 2° to 10°.

5. An apparatus according to claim 4 in which the length and width dimensions of the pleated specimen are 2 to 5 times the corresponding dimensions of the other specimen.

6. An apparatus according to claim 5 in which the thickness of the specimens is about 0.001 to 0.01 inch.

References Cited in the file of this patent
UNITED STATES PATENTS
2,839,722    Marsh _____ June 17, 1958